United States Patent
Ozaki et al.

(10) Patent No.: US 10,579,934 B2
(45) Date of Patent: Mar. 3, 2020

(54) DATA CLASSIFICATION DEVICE, NON-TRANSITORY COMPUTER READABLE MEDIUM, AND DATA CLASSIFICATION METHOD

(71) Applicant: FUJI XEROX CO., LTD., Tokyo (JP)

(72) Inventors: Ryota Ozaki, Kanagawa (JP); Yukihiro Tsuboshita, Kanagawa (JP); Noriji Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 764 days.

(21) Appl. No.: 15/203,448

(22) Filed: Jul. 6, 2016

(65) Prior Publication Data

US 2017/0228656 A1   Aug. 10, 2017

(30) Foreign Application Priority Data

Feb. 5, 2016   (JP) ................................. 2016-020748

(51) Int. Cl.
*G06N 7/00*  (2006.01)
*G06N 20/00*  (2019.01)

(52) U.S. Cl.
CPC ............. *G06N 7/005* (2013.01); *G06N 20/00* (2019.01)

(58) Field of Classification Search
CPC .............................. G06N 7/005; G06N 20/00
See application file for complete search history.

(56) References Cited

U.S. PATENT DOCUMENTS

| | | | | |
|---|---|---|---|---|
| 6,665,335 B1 * | 12/2003 | Rajagopal | ............... | G01S 7/292 375/224 |
| 7,019,756 B2 * | 3/2006 | Park | ........................ | G06T 5/009 345/426 |
| 9,076,197 B2 * | 7/2015 | Wehnes | ................. | G06T 7/0012 |
| 2003/0123731 A1 * | 7/2003 | Boettcher | ............. | G06K 9/6276 382/181 |

(Continued)

FOREIGN PATENT DOCUMENTS

| | | |
|---|---|---|
| JP | 04-098422 B2 | 3/1992 |
| JP | 05-128084 B2 | 5/1993 |

OTHER PUBLICATIONS

Dec. 5, 2019 Office Action issued in Japanese Patent Application No. 2016-020748.

*Primary Examiner* — Alexey Shmatov
*Assistant Examiner* — Tri T Nguyen
(74) *Attorney, Agent, or Firm* — Oliff PLC

(57) ABSTRACT

A data classification device includes an estimation unit that estimates, for each of one or more classes provided for learning data pieces in a feature-amount-data space that includes multiple learning data pieces, probability densities of learning data pieces belonging to the class and learning data pieces not belonging to the class around a judgment target data piece in the feature-amount-data space, a calculation unit that calculates, based on the probability densities, an index indicating how much the judgment target data piece is likely to belong to the class, and a judgment unit that judges which class the judgment target data piece belongs to by using the index. Based on distribution of positive data pieces belonging to the class and negative data pieces not belonging to the class around the judgment target data piece, the estimation unit determines a size of a region used for the estimation.

4 Claims, 7 Drawing Sheets

(56) References Cited

U.S. PATENT DOCUMENTS

| | | | | |
|---|---|---|---|---|
| 2008/0306898 A1* | 12/2008 | Tsypin | ............... | G06K 9/6273 706/61 |
| 2009/0125463 A1* | 5/2009 | Hido | ................. | G06N 20/00 706/12 |
| 2009/0257682 A1* | 10/2009 | Wang | ................. | G06K 9/3208 382/289 |
| 2011/0013847 A1* | 1/2011 | Statsenko | ......... | G06K 9/00456 382/224 |
| 2013/0094718 A1* | 4/2013 | Icho | ................. | G06F 16/29 382/113 |
| 2014/0180980 A1* | 6/2014 | Hido | ................. | G06N 20/00 706/12 |
| 2016/0026915 A1* | 1/2016 | Delp | ................. | G05B 23/0229 706/20 |
| 2016/0068915 A1* | 3/2016 | Kennedy | ............ | G16B 25/00 506/2 |

* cited by examiner

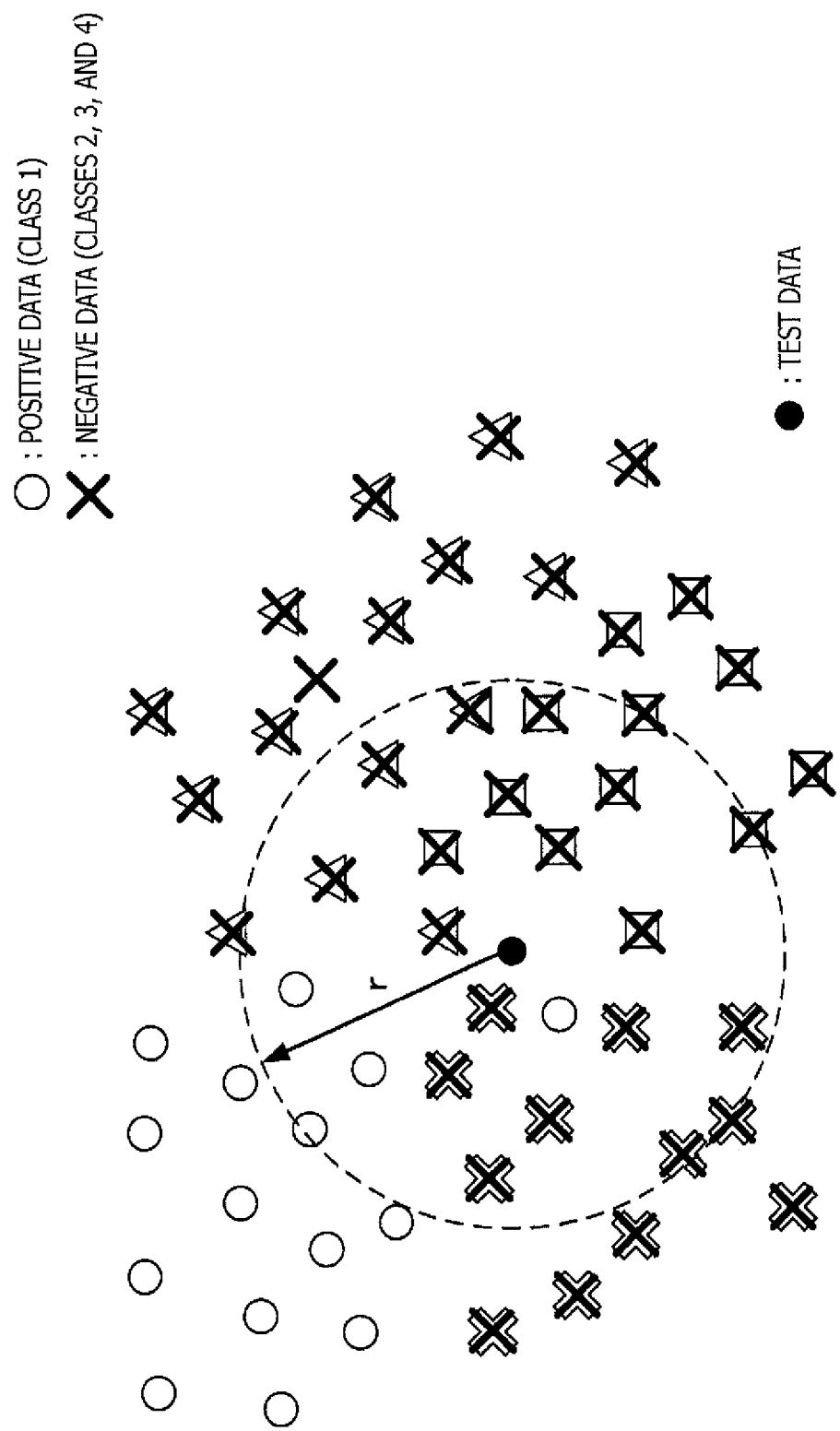

DATA CLASSIFICATION DEVICE, NON-TRANSITORY COMPUTER READABLE MEDIUM, AND DATA CLASSIFICATION METHOD

CROSS-REFERENCE TO RELATED APPLICATIONS

This application is based on and claims priority under 35 USC 119 from Japanese Patent Application No. 2016-020748 filed Feb. 5, 2016.

BACKGROUND

Technical Field

The present invention relates to a data classification device, a non-transitory computer readable medium, and a data classification method.

SUMMARY

According to an aspect of the invention, there is provided a data classification device including an estimation unit, a calculation unit, and a judgment unit. The estimation unit estimates, for each of one or more classes provided for learning data pieces in a feature-amount-data space that includes multiple learning data pieces, probability densities of learning data pieces located around a judgment target data piece in the feature-amount-data space. The probability densities are respectively a density of learning data pieces belonging to the class and a density of learning data pieces not belonging to the class. The calculation unit calculates an index indicating how much the judgment target data piece is likely to belong to the class. The calculation unit calculates the index on a basis of the probability densities that are estimated by the estimation unit and that are respectively the probability density of the learning data pieces belonging to the class and the probability density of the learning data pieces not belonging to the class. The judgment unit judges which one of the classes the judgment target data piece belongs to by using the index calculated for each class by the calculation unit. In accordance with distribution of positive data pieces and negative data pieces around the judgment target data piece in the feature-amount-data space, the estimation unit determines a region size of a region used for estimating the probability densities. The positive data pieces are the learning data pieces belonging to the class, and the negative data pieces are the learning data pieces not belonging to the class.

BRIEF DESCRIPTION OF THE DRAWINGS

An exemplary embodiment of the present invention will be described in detail based on the following figures, wherein:

FIG. 8 is a diagram illustrating a case where a region size is determined based on a distance from a test data piece to a learning data piece farthest from the test data piece among neighborhood positive and negative data pieces.

DETAILED DESCRIPTION

Subsequently, an exemplary embodiment will be described in detail with reference to the drawings.

Figure 1:
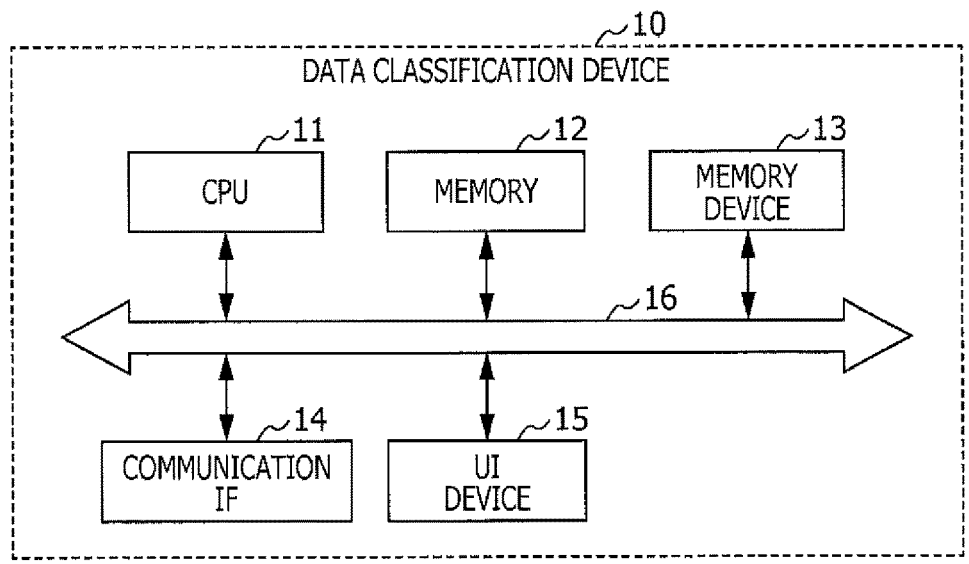
FIG. 1 is a block diagram illustrating the hardware configuration of a data classification device according to an exemplary embodiment.

FIG. 1 is a block diagram illustrating the hardware configuration of a data classification device 10 according to the exemplary embodiment.

As illustrated in FIG. 1, the data classification device 10 according to the exemplary embodiment includes a central processing unit (CPU) 11, a memory 12, a memory device 13 such as a hard disk drive (HDD), a communication interface (IF) 14 that transmits and receive data to and from an external device or the like through a network, and a user interface (UI) device 15 including a keyboard and any of a touch panel and a liquid crystal display. These components are connected to each other via a control bus 16.

The CPU 11 executes a predetermined process on the basis of a control program stored in the memory 12 or the memory device 13 and thereby controls the operation of the data classification device 10. In the description for the exemplary embodiment, the CPU 11 reads and runs the control program stored in the memory 12 or the memory device 13 but may be provided with the program stored in a storage medium such as a compact disc read-only memory (CD-ROM).

Figure 2:
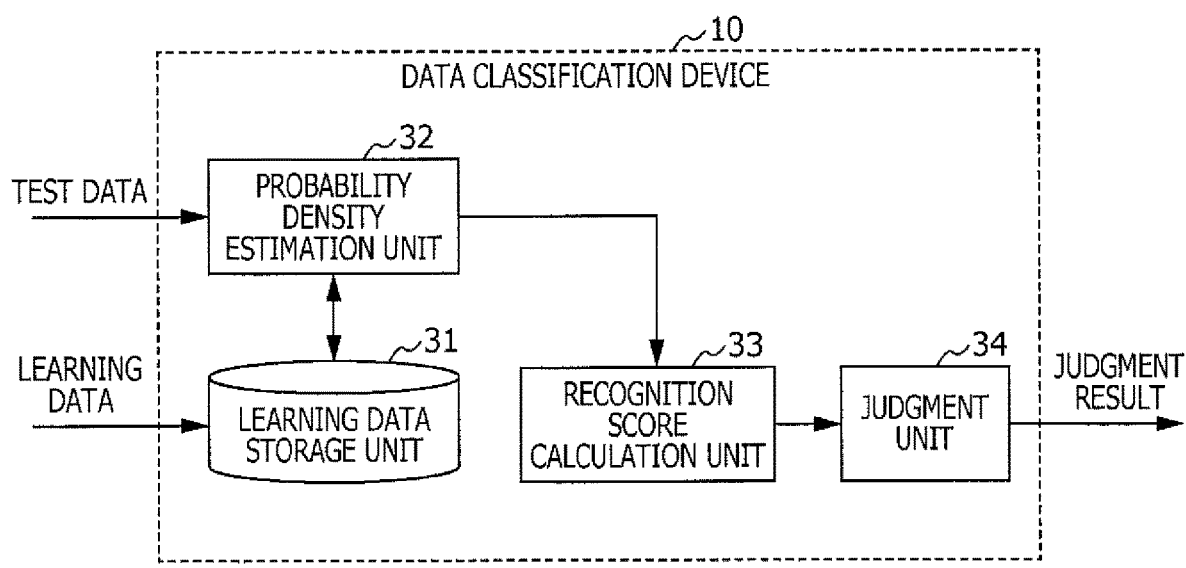
FIG. 2 is a block diagram illustrating the functional configuration of the data classification device according to the exemplary embodiment.

FIG. 2 is a block diagram illustrating the functional configuration of the data classification device 10 implemented by running the control program.

As illustrated in FIG. 2, the data classification device 10 according to the exemplary embodiment includes a learning data storage unit 31, a probability density estimation unit 32, a recognition score calculation unit 33, and a judgment unit 34.

In the exemplary embodiment, the learning data storage unit 31 stores multiple learning data pieces together with information regarding classes to which the learning data pieces belong. The multiple learning data pieces form a feature-amount-data space (data space expressed by feature amounts). The feature-amount-data space may include learning data pieces for which one or more classes are provided. Accordingly, in some cases, the feature-amount-data space includes an unclassified learning data piece that does not belong to any of the classes.

For example, if the learning data pieces are image data pieces, color information, edge information, or the like that is extracted from each image data piece serves as a feature amount, and label information or the like (information indicating a dog image, a cat image, an automobile image, or the like) in advance assigned to the image data piece serves as a class to which the learning data piece belongs. In such a case, multiple pieces of information extracted from one image data piece may also serve as feature amounts. For example, one image is divided into multiple partial regions, and a feature amount is extracted from each partial region resulting from the division. Multiple feature amounts may thus be extracted from the one image.

In addition, for example, if the learning data pieces are voice data pieces, frequency component information or the like of a phoneme extracted from each voice data piece serves as a feature amount, and label information or the like (such as information regarding the speaker or words corresponding to the voice) in advance assigned to the voice data piece serves as a class to which the voice data piece belongs.

Further, for example, if the learning data pieces are text data pieces, information or the like based on vectors obtained by extracting words from each text data piece serves as a feature amount, and label information or the like (such as information regarding the type of a document, polarity, or the like of the text data piece) in advance assigned to the text data piece serves as a class to which the text data piece belongs.

The probability density estimation unit 32 estimates, for each class, the probability densities of learning data pieces around a test data piece in the feature-amount-data space. The feature-amount-data space is formed by multiple learning data pieces stored in the learning data storage unit 31 and includes learning data pieces for which one or more classes are provided. The test data piece (a judgment target data piece) is to be judged as to which class the test data piece belongs to. The probability densities are the density of learning data pieces belonging to any of the classes and the density of the learning data pieces not belonging to the classes.

Specifically, the probability density estimation unit 32 determines the size of a region used for estimating the probability densities that are estimated by counting positive data pieces and negative data pieces around the test data piece in the feature-amount-data space formed by the multiple learning data pieces. A positive data piece is a learning data piece that belongs to a specific class, and a negative data piece is a learning data piece that does not belong to the class. The probability density estimation unit 32 determines the region size on the basis of the distribution of the positive and negative data pieces. The probability density estimation unit 32 then counts positive data pieces and negative data pieces included in the region of the determined region size and thereby estimates, for each class, the probability densities of the learning data pieces around the test data piece.

A probability-density estimation process performed by the probability density estimation unit 32 will hereinafter be described in detail by taking a specific example.

Selecting Neighborhood Positive and Negative Data Pieces

In the description, for example, the learning data pieces in the feature-amount-data space have been classified into four classes of classes C1, C2, C3, and C4. In such a case, the probability density estimation unit 32 first selects, as neighborhood positive data and neighborhood negative data, four positive data pieces (learning data pieces belonging to the class C1) and four negative data pieces (learning data pieces not belonging to the class C1, that is, belonging to the classes C2 to C4). The positive and negative data pieces are located close to the test data piece in the feature-amount-data space.

Note that the neighborhood positive data pieces and the neighborhood negative data pieces may be selected in the following manner. Specifically, distances between the test data piece and all of the learning data pieces are calculated, and the four learning data pieces closest to the test data piece are selected as each of the neighborhood positive data and the neighborhood negative data. Alternatively, an approximation such as a K-dimensional (KD) tree may also be used to select each group of the four learning data pieces.

In the description, the four learning data pieces are selected as each of the neighborhood positive data and the neighborhood negative data. However, the numbers of learning data pieces selected as the neighborhood positive data and the neighborhood negative data are not limited to the same number. Different numbers of learning data pieces may be selected as the neighborhood positive data and the neighborhood negative data.

Note that the probability density estimation unit 32 may impose a restriction on the selection of the neighborhood positive data pieces and the neighborhood negative data pieces in such a manner as not to select, as the neighborhood positive or negative data, any learning data piece that is a predetermined distance away from the test data piece.

Determining Region Size

As described above, the probability density estimation unit 32 subsequently determines the region size on the basis of the distribution of the positive and negative data pieces around the test data piece in the feature-amount-data space.

Region-size Determination Method 1

For example, from a predetermined number of positive data pieces and a predetermined number of negative data pieces that are located close to the test data piece in the feature-amount-data space, the probability density estimation unit 32 selects a learning data piece located at a distance that is longest from the test data piece. The probability density estimation unit 32 determines, as the region size, the distance between the selected learning data piece and the test data piece.

Region-size Determination Method 2

For example, the probability density estimation unit 32 selects a learning data piece located at a distance that is a mean of distances from the test data piece to a predetermined number of positive data pieces and a predetermined number of negative data pieces that are located close to the test data piece in the feature-amount-data space. The probability density estimation unit 32 determines the distance between the selected learning data piece and the test data piece as the region size.

Region-size Determination Method 3

For example, the probability density estimation unit 32 selects a learning data piece located at a distance that is a median of distances from the test data piece to a predetermined number of positive data pieces and a predetermined number of negative data pieces that are located close to the test data piece in the feature-amount-data space. The probability density estimation unit 32 determines the distance between the selected learning data piece and the test data piece as the region size.

Region-size Determination Method 4

For example, the probability density estimation unit 32 selects a positive data piece located at a distance that is a mean of distances from the test data piece to a predetermined number of positive data pieces located close to the test data piece in the feature-amount-data space. The probability density estimation unit 32 also selects a negative data piece located at a distance that is a mean of distances from the test data piece to a predetermined number of negative data pieces located close to the test data piece in the feature-amount-data space. From the selected positive and negative data pieces, the probability density estimation unit 32 further selects one of the learning data pieces that is located at a longer distance from the test data piece than the other. The probability density estimation unit 32 determines, as the region size, the distance between the further selected learning data piece and the test data piece.

Region-size Determination Method 5

For example, the probability density estimation unit 32 selects a positive data piece located at a distance that is a median of distances from the test data piece to a predetermined number of positive data pieces located close to the test data piece in the feature-amount-data space. The probability density estimation unit 32 also selects a negative data piece located at a distance that is a median of distances from the test data piece to a predetermined number of negative data pieces located close to the test data piece in the feature-amount-data space. From the selected positive and negative data pieces, the probability density estimation unit 32 further selects one of the data pieces that is located in a longer distance from the test data piece than the other. The probability density estimation unit 32 determines, as the region size, the distance between the further selected data piece and the test data piece.

If an estimated probability density is lower than a predetermined lower limit, the probability density estimation unit 32 may set the value of the probability density by replacing the value of the estimated probability density with the lower limit. To determine the lower limit, preliminary experiments may be performed to set an appropriate value as the lower limit. Alternatively, the lower limit may be set based on the minimum value of single-precision or double-precision floating-point numbers.

If the determined region size is larger than a predetermined upper limit, the probability density estimation unit 32 may set the region size to the upper limit. To determine the upper limit, preliminary experiments may be performed to set an appropriate value as the upper limit. The upper limit may be set based on a mean of distances between each of the learning data pieces and the closest learning data piece thereto or based on the standard deviation or the like of the learning data pieces.

Counting Positive Data Pieces and Negative Data Pieces in Region

Based on the region size determined by one of the methods as described above, the probability density estimation unit 32 subsequently counts, for each class, the positive data pieces and the negative data pieces within the region including the test data piece at the center.

For example, if the type of region is a hypersphere, the probability density estimation unit 32 uses, as a region for estimating the probability densities, a hypersphere having a radius corresponding to a determined region size and thereby counts positive data pieces and negative data pieces included in the hypersphere region.

For example, if the type of region is a hypercube, the probability density estimation unit 32 uses, as a region for estimating the probability densities, a hypercube having each side two times the determined region size and thereby counts positive data pieces and negative data pieces included in the hypercube region. Since a length two times the region size is used as the length of each side of the hypercube in the case of using the hypercube type as the region type, positive and negative data pieces each located at a distance from the test data piece that is half of the side or that is equal to or shorter than the value of a diagonal line are counted with respect to classes for which the probability densities are to be estimated. Note that the diagonal line may be defined as follows where the degree of the test data piece is d, and the length of each side is 2r.

$$2r\sqrt{d}$$

Calculating Volume of Region

Based on the region size determined by one of the methods as described above, the probability density estimation unit 32 subsequently calculates the volume of the region for counting the positive data pieces and the negative data pieces.

For example, if the hypersphere is used as the region, a region volume V is calculated by using the region size as the radius of the hypersphere in accordance with the following formula where the degree of the test data piece is d and the region size is r.

$$V = \frac{\pi^{\frac{d}{2}} r^d}{\Gamma\left(\frac{d}{2}+1\right)}$$

For example, if the hypercube is used as the region, the region volume V is calculated by using each side of the hypercube that is two times the region size in accordance with the following formula where the degree of the test data piece is d and the region size is r.

$$V = (2r)^d$$

Estimating Probability Densities

Based on the region volume V and the counts of the positive data pieces and the negative data pieces within the region that are obtained by the method as described above, the probability density estimation unit 32 subsequently estimates, for each class, the probability densities of the positive data pieces and the probability density of the negative data pieces.

Here, consider a case where a test data piece is x, and among the multiple learning data pieces, the count of positive data pieces belonging to a class C is $N_p$, and the count of negative data pieces is $N_n$. In addition, in the region, the count of the positive data pieces is $K_p$, and the count of negative data pieces is $K_n$. In this case, the probability density of the positive data pieces belonging to the class C with respect to the test data piece x is estimated in accordance with the following formula.

$$P(x \mid C) = \frac{K_p}{N_p V}$$

Likewise, the probability density of the negative data pieces not belonging to the class C with respect to the test data piece x is estimated in accordance with the following formula.

$$P(x \mid \overline{C}) = \frac{K_n}{N_n V}$$

In addition, consider a case where any one of the counts of the positive data pieces and negative data pieces included in the region used for estimating the probability densities is 0 because the value of the region size is set to the upper limit.

Even in this case, the probability density estimation unit 32 estimates the probability density by using any one of the positive data and the negative data the count of which is not 0.

Calculating Recognition Score

The probability density estimation unit 32 estimates the probability densities of the learning data pieces belonging to classes and the learning data pieces not belonging to the classes. Based on the probability densities, the recognition score calculation unit 33 calculates recognition scores $S_c$ that are each an index indicating how much the test data piece is likely to belong to the corresponding class in accordance with the following formula.

$$S_c = \log\left(\frac{p(C|x)}{p(\overline{C}|x)}\right) = \log P(C) + \log P(x|C) - \log(1 - P(C)) - \log P(x|\overline{C})$$

In the formula above, P(C) is an a-priori probability that the test data piece x belongs to the class C, and P(C|x) is an a-posteriori probability that the test data piece x belongs to the class C.

The following formula represents an a-posteriori probability that the test data piece x does not belong to the class C.

$$P(\overline{C}|x)$$

The judgment unit 34 lastly judges which class the test data piece belongs to by using the recognition scores $S_c$ calculated by the recognition score calculation unit 33 for each class.

For example, the judgment unit 34 may judge a class having the highest recognition score $S_c$ to be a class to which the test data piece belongs. The judgment unit 34 may also judge a class having a recognition score $S_c$ equal to or higher than a predetermined threshold to be the class to which the test data piece belongs. Further, if the recognition score $S_c$ is lower than the predetermined threshold, the judgment unit 34 may judge that the test data piece does not belong to any class.

Subsequently, the operation of the data classification device 10 according to the exemplary embodiment will be described in detail with reference to the drawings.

Figure 3:
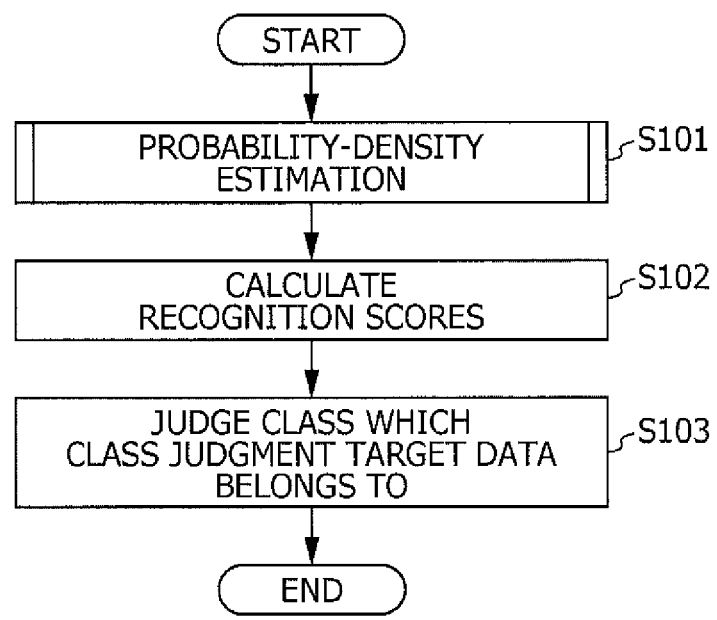
FIG. 3 is a flowchart for explaining the overall operation of the data classification device according to the exemplary embodiment.

First, the overall operation of the data classification device 10 according to the exemplary embodiment will be described with reference to a flowchart in FIG. 3.

A test data piece for judging which class the test data piece belongs to is input to the data classification device 10. By using the method described above, the probability density estimation unit 32 then estimates, for each class, the probability densities of positive data pieces and negative data pieces around the test data piece in the feature-amount-data space (step S101). The details of the probability-density estimation process will be described below.

For example, the learning data pieces are classified into three classes of the classes C1 to C3 in the feature-amount-data space. In this case, the probability density estimation unit 32 calculates, for each of the classes C1 to C3, the probability densities of the positive data pieces and the negative data pieces as described below.

$$P(x|C_1), P(x|\overline{C}_1)$$

$$P(x|C_2), P(x|\overline{C}_2)$$

$$P(x|C_3), P(x|\overline{C}_3)$$

Based on each probability density of the learning data pieces belonging to the corresponding class and each probability density of the learning data pieces not belonging to the class that are estimated by the probability density estimation unit 32, the recognition score calculation unit 33 calculates a corresponding one of recognition scores $S_{c1}$, $S_{c2}$, and $S_{c3}$ that are each an index indicating how much the test data piece is likely to belong to the corresponding class by using the method as described above (step S102).

The judgment unit 34 lastly judges which class the test data piece belongs to by using the recognition scores $S_{c1}$, $S_{c2}$, and $S_{c3}$ calculated for each class by the recognition score calculation unit 33 (step S103). For example, if the recognition score $S_{c2}$ is the highest of the recognition scores $S_{c1}$, $S_{c2}$, and $S_{c3}$ calculated for each class, the judgment unit 34 judges that the class to which the test data piece belongs is the class C2.

Figure 4:
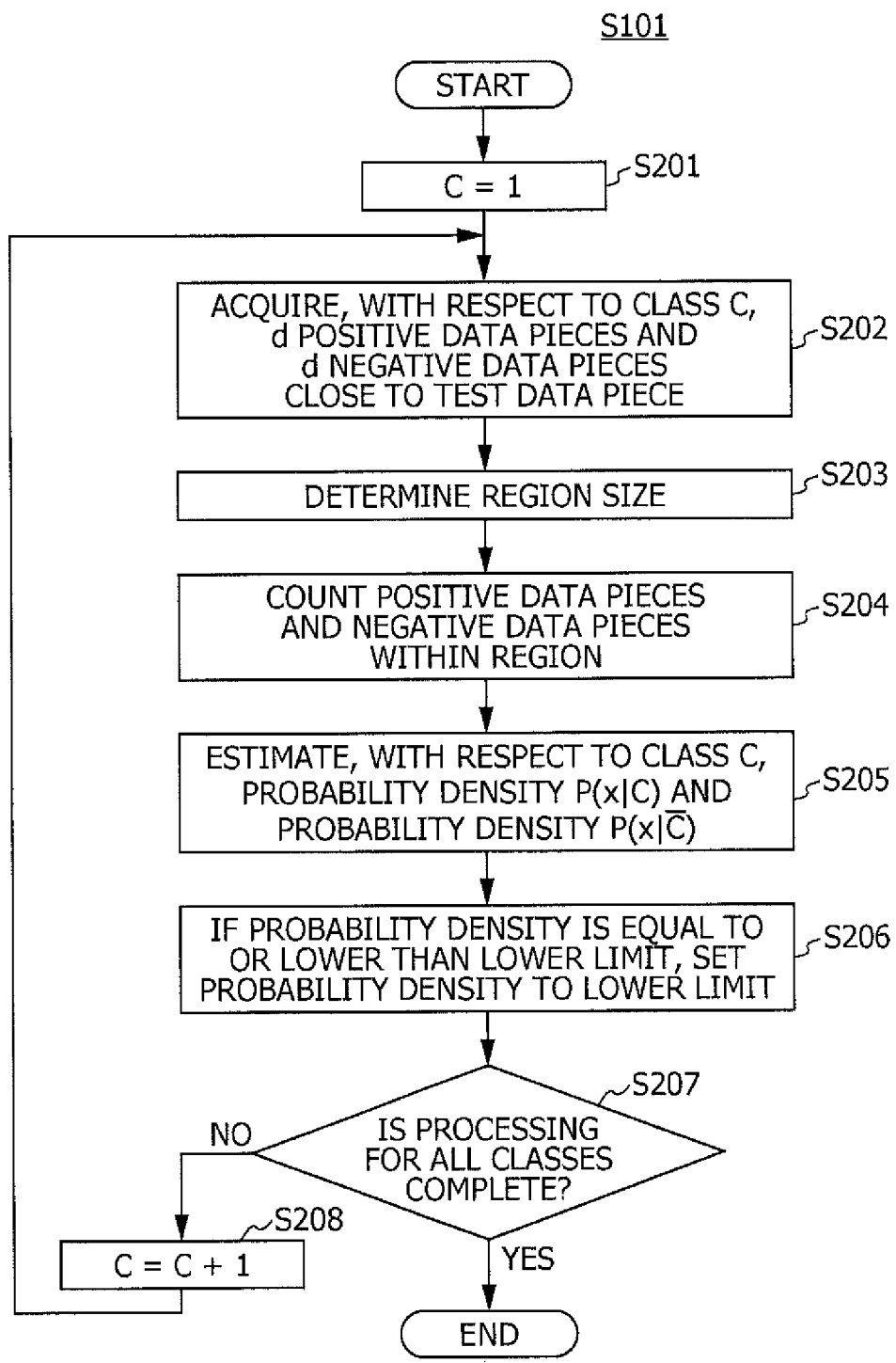
FIG. 4 is a flowchart for explaining the details of a probability-density estimation process (step S101) described with reference to the flowchart in FIG. 3.

Subsequently, the details of the probability-density estimation process (step S101) described above will be described with reference to a flowchart in FIG. 4.

First, the probability density estimation unit 32 sets, to the class C1, the class for which the probability density is estimated (step S201). The probability density estimation unit 32 selects, as neighborhood positive data and neighborhood negative data, d positive data pieces (learning data pieces belonging to the class C1) and d negative data pieces (learning data pieces not belonging to the class C1, that is, belonging to the classes C2 and C3) (step S202). The positive and negative data pieces are close to the test data piece in the feature-amount-data space.

The probability density estimation unit 32 determines the region size of a region used to estimate the probability densities, by using the method as described above (step S203). The probability density estimation unit 32 counts positive data pieces and negative data pieces within the region on the basis of the determined region size (step S204).

Since the class for which the probability density is estimated is herein set to the class C1, the probability density estimation unit 32 counts learning data pieces belonging to the class C1 as the positive data and learning data pieces belonging to the classes C2 and C3 as the negative data.

Based on the counts of the positive data pieces and the negative data pieces, the probability density estimation unit 32 estimates the probability density of the positive data pieces with respect to the class C1 and the probability density of the negative data pieces (step S205).

If the estimated probability density is equal to or lower than the lower limit, the probability density estimation unit 32 sets the value of the probability density to the lower limit to thereby prevent the value of the probability density from being lower than the lower limit (step S206).

If the estimation of the probability density is complete for each of the classes C1 to C3, the probability-density estimation process is terminated. However at this stage, the estimation of the probability density for only the class C1 is complete (NO in step S207), the probability density estimation unit 32 thus increments the class for which the probability density is estimated by one and sets the class to the class C2 (step S208).

The probability density estimation unit 32 repeats steps S202 to S206 for the class C2, lastly repeats the same steps for the class C3, and thereafter terminates the entire process.

The operation of the data classification device 10 according to the exemplary embodiment will be described by taking a specific example of the feature-amount-data space.

In the following description, one type of feature amount and one circular region are used for simplicity.

Figure 5:
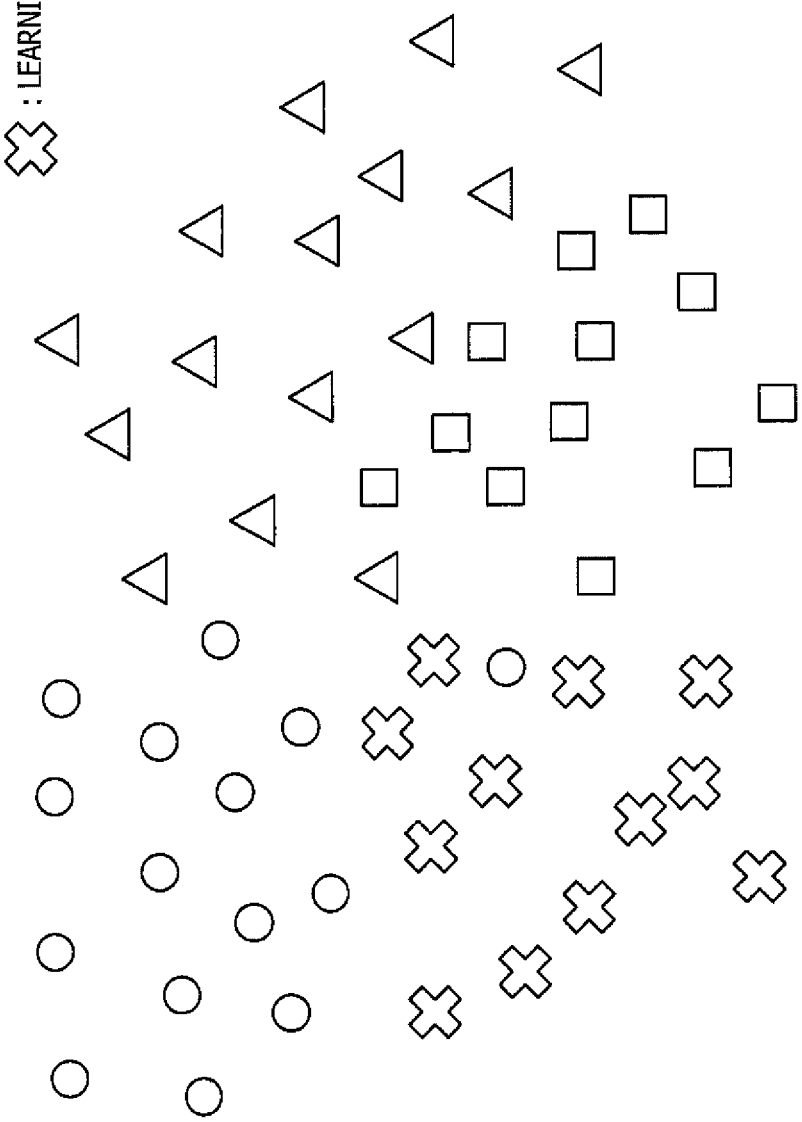
FIG. 5 is a diagram illustrating an example feature-amount-data space.

The feature-amount-data space as illustrated in FIG. 5 is taken as an example in the following description. In the feature-amount-data space example illustrated in FIG. 5, learning data pieces are classified into the classes C1 to C4 (classes 1, 2, 3, and 4).

In the plot, circles represent learning data pieces belonging to the class C1 (class 1), squares represent learning data pieces belonging to the class C2 (class 2), triangles represent learning data pieces belonging to the class C3 (class 3), and crosses represent learning data pieces belonging to the class C4 (class 4).

Figure 6:
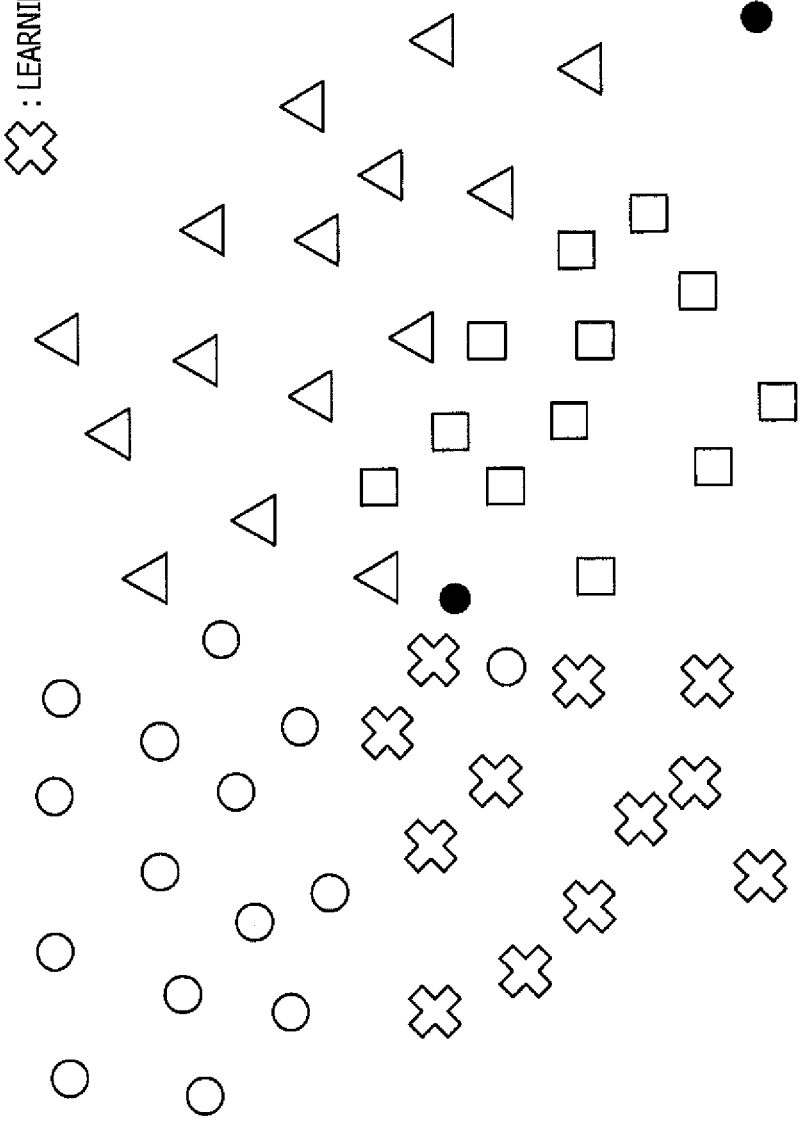
FIG. 6 is a diagram for explaining judgment of a class to which a test data piece belongs in the feature-amount-data space example illustrated in FIG. 5.

Judging which class the test data piece as illustrated in FIG. 6 belongs to in the feature-amount-data space example illustrated in FIG. 5 will be described.

Figure 7:
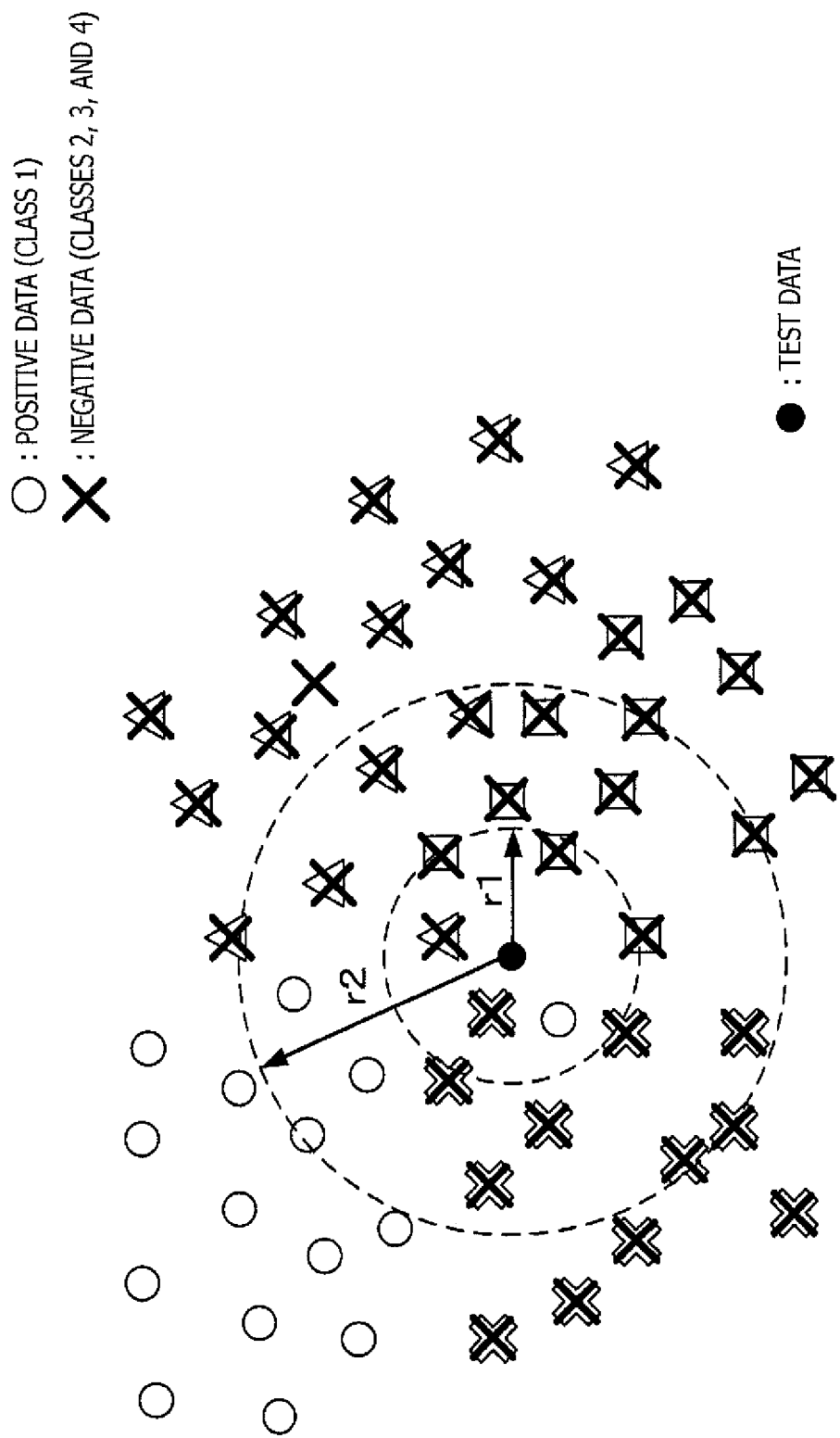
FIG. 7 is a diagram illustrating a case where positive data pieces with respect to a class C1 and negative data pieces with respect to the class C1 (learning data pieces belonging to classes C2, C3, and C4) that are to be used for estimating the probability densities are selected when each of the numbers of positive data pieces and negative data pieces is fixed to 4.

FIG. 7 illustrates a case where positive data pieces with respect to the class C1 and negative data pieces with respect to the class C1 (learning data pieces belonging to the classes C2 to C4) are selected under the circumstances as described above. In this case, the number of positive data pieces and the number of negative data pieces are each fixed to 4, as in the probability-density estimation method in the related art. The positive and negative data pieces are used for estimating the probability densities.

It is understood from FIG. 7 that a radius r1 of a region including the four negative data pieces close to the test data piece is largely different from a radius r2 of a region including the four positive data pieces close to the test data piece because the numbers of positive data pieces and negative data pieces used for estimating the probability densities are each fixed to 4.

If the region size used for calculating the probability densities differs largely between the positive data pieces and the negative data pieces, the probability density estimation accuracy differs largely between the positive data pieces and the negative data pieces. Specifically, the accuracy in estimating the probability density of the negative data pieces is higher than the accuracy in estimating the probability density of the positive data pieces.

In contrast, estimation of the probability densities using the data classification device 10 according to the exemplary embodiment will be described with reference to FIG. 8.

FIG. 8 illustrates a case where from the neighborhood positive data pieces and neighborhood negative data pieces, a learning data piece located at the longest distance from the test data piece is selected, and the distance is used as the region size.

In the example illustrated in FIG. 8, the region sizes used for respectively estimating the probability densities of the positive data pieces and the probability density of the negative data pieces are the same value as a radius r. Accordingly, it is understood that even if the density differs largely between the positive data pieces and the negative data pieces all of which are located around the test data piece, the probability density estimation accuracy does not differ between the positive data pieces and the negative data pieces.

Extracting M Feature Amounts from One Learning Data Piece

In the description for the exemplary embodiment above, one feature amount is extracted from one data piece for simplicity, but the exemplary embodiment is not limited to such a case.

For example, if M feature amounts are extracted from one data piece, test data pieces are ($x_1, x_2, \ldots x_M$). In this case, for a test data piece i, the probability density of the positive data pieces with respect to the class C is $P(x_i|C)$, and the probability density of the negative data pieces is obtained in accordance with the following formula.

$$P(x_i|\overline{C})$$

The recognition score $S_c$ for the corresponding class is obtained based on the probability densities of the positive data pieces and the negative data pieces in accordance with the following formula.

$$S_c = \log\left(\frac{p(C|x_1, \ldots, x_M)}{p(\overline{C}|x_1, \ldots, x_M)}\right) = $$
$$\log P(C) + \sum_{i=1}^{M} \log P(x|C) - \log(1 - P(C)) - \sum_{i=1}^{M} \log P(x|\overline{C})$$

Note that $P(C)$ is the priori probability with respect to the class C, and the following formula is an a-posteriori probability that the test data pieces ($x_1, x_2, \ldots x_M$) belong to the class C.

$$P(C|x_1, \ldots, x_M)$$

In addition, the following formula is an a-posteriori probability that the test data pieces ($x_1, x_2, \ldots x_M$) do not belong to the class C.

$$P(\overline{C}|x_1, \ldots, x_M)$$

Also in the case where multiple feature amounts are extracted from one data piece, the exemplary embodiment is likewise made applicable by performing the calculations as described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data classification device comprising at least one processor programmed to function as:
    an estimation unit that estimates, for each of one or more classes provided for learning data pieces in a feature-amount-data space that includes a plurality of learning data pieces, probability densities of learning data pieces located around a judgment target data piece in the feature-amount-data space, the probability densities being respectively a density of learning data pieces belonging to the class and a density of learning data pieces not belonging to the class;
    a calculation unit that calculates an index indicating how much the judgment target data piece is likely to belong to the class, the calculation unit calculating the index on a basis of the probability densities that are estimated by the estimation unit and that are respectively the probability density of the learning data pieces belonging to the class and the probability density of the learning data pieces not belonging to the class; and a judgment unit that judges which one of the classes the judgment target data piece belongs to by using the index calculated for each class by the calculation unit, wherein in accordance with distribution of positive data pieces and negative data pieces around the judgment target data piece in the feature-amount-data space, the estimation unit determines a region size of a region used for estimating the probability densities, the positive data pieces being the learning data pieces belonging to the class, the negative data pieces being the learning data pieces not belonging to the class, and wherein the estimation unit selects one of a predetermined number of positive data pieces that are located close to the judgment target data piece in the feature-amount-data space, the selected one of the predetermined number of positive data pieces being located at a distance that is a mean of distances from the judgment target data piece to the predetermined number of positive data pieces, the estimation unit selects one of a predetermined number of negative data pieces that are located close to the judgment target data piece in the feature-amount-data space, the selected one of the predetermined number of negative data pieces being located at a distance that is a mean of distances from the judgment target data piece to the predetermined number of negative data pieces, the estimation unit further selects one of the selected positive data piece and the selected negative data piece, the further selected one of the selected positive data piece and the selected negative data piece being located at a distance longer than not further selected one of the selected positive data piece and the selected negative data piece, and the estimation unit determines, as the region size, the distance from the judgment target data piece to the further selected one of the positive data piece and the negative data piece.

2. A data classification device comprising at least one processor programmed to function as:

an estimation unit that estimates, for each of one or more classes provided for learning data pieces in a feature-amount-data space that includes a plurality of learning data pieces, probability densities of learning data pieces located around a judgment target data piece in the feature-amount-data space, the probability densities being respectively a density of learning data pieces belonging to the class and a density of learning data pieces not belonging to the class;

a calculation unit that calculates an index indicating how much the judgment target data piece is likely to belong to the class, the calculation unit calculating the index on a basis of the probability densities that are estimated by the estimation unit and that are respectively the probability density of the learning data pieces belonging to the class and the probability density of the learning data pieces not belonging to the class; and a judgment unit that judges which one of the classes the judgment target data piece belongs to by using the index calculated for each class by the calculation unit, wherein in accordance with distribution of positive data pieces and negative data pieces around the judgment target data piece in the feature-amount-data space, the estimation unit determines a region size of a region used for estimating the probability densities, the positive data pieces being the learning data pieces belonging to the class, the negative data pieces being the learning data pieces not belonging to the class, and wherein the estimation unit selects one of a predetermined number of positive data pieces that are located close to the judgment target data piece in the feature-amount-data space, the selected one of the predetermined number of positive data pieces being located at a distance that is a median of distances from the judgment target data piece to the predetermined number of positive data pieces, the estimation unit selects one of a predetermined number of negative data pieces that are located close to the judgment target data piece in the feature-amount-data space, the selected one of the predetermined number of negative data pieces being located at a distance that is a median of distances from the judgment target data piece to the predetermined number of negative data pieces, the estimation unit further selects one of the selected positive data piece and the selected negative data piece, the further selected one of the selected positive data piece and the selected negative data piece being located at a distance longer than not further selected one of the selected positive data piece and the selected negative data piece, and the estimation unit determines, as the region size, the distance from the judgment target data piece to the further selected one of the positive data piece and the negative data piece.

3. A non-transitory computer readable medium storing a program causing a computer to execute a process comprising:

estimating, for each of one or more classes provided for learning data pieces in a feature-amount-data space that includes a plurality of learning data pieces, probability densities of learning data pieces located around a judgment target data piece in the feature-amount-data space, the probability densities being respectively a density of learning data pieces belonging to the class and a density of learning data pieces not belonging to the class, the estimating including determining, in accordance with distribution of positive data pieces and negative data pieces around the judgment target data piece in the feature-amount-data space, a region size of a region used for estimating the probability densities, the positive data pieces being the learning data pieces belonging to the class, the negative data pieces being the learning data pieces not belonging to the class;

calculating an index indicating how much the judgment target data piece is likely to belong to the class, the calculating being performed based on the probability densities that are estimated in the estimating and that are respectively the probability density of the learning data pieces belonging to the class and the probability density of the learning data pieces not belonging to the class;

judging which one of the classes the judgment target data piece belongs to by using the index calculated for each class in the calculating; and selecting one of a predetermined number of positive data pieces that are located close to the judgment target data piece in the feature-amount-data space, the selected one of the predetermined number of positive data pieces being located at a distance that is a mean of distances from the judgment target data piece to the predetermined number of positive data pieces;

selecting one of a predetermined number of negative data pieces that are located close to the judgment target data piece in the feature-amount-data space, the selected one of the predetermined number of negative data pieces being located at a distance that is a mean of distances from the judgment target data piece to the predetermined number of negative data pieces;

selecting one of the selected positive data piece and the selected negative data piece, the further selected one of the selected positive data piece and the selected negative data piece being located at a distance longer than not further selected one of the selected positive data piece and the selected negative data piece; and determining, as the region size, the distance from the judgment target data piece to the further selected one of the positive data piece and the negative data piece.

4. A data classification method comprising:

estimating, for each of one or more classes provided for learning data pieces in a feature-amount-data space that includes a plurality of learning data pieces, probability densities of learning data pieces located around a judgment target data piece in the feature-amount-data space, the probability densities being respectively a density of learning data pieces belonging to the class and a density of learning data pieces not belonging to the class, the estimating including determining, in accordance with distribution of positive data pieces and negative data pieces around the judgment target data piece in the feature-amount-data space, a region size of a region used for estimating the probability densities, the positive data pieces being the learning data pieces belonging to the class, the negative data pieces being the learning data pieces not belonging to the class;

calculating an index indicating how much the judgment target data piece is likely to belong to the class, the calculating being performed based on the probability densities that are estimated in the estimating and that are respectively the probability density of the learning data pieces belonging to the class and the probability density of the learning data pieces not belonging to the class;

judging which one of the classes the judgment target data piece belongs to by using the index calculated for each class in the calculating; and selecting one of a predetermined number of positive data pieces that are located close to the judgment target data piece in the feature-amount-data space, the selected one of the predetermined number of positive data pieces being located at a distance that is a mean of distances from the judgment target data piece to the predetermined number of positive data pieces;

selecting one of a predetermined number of negative data pieces that are located close to the judgment target data piece in the feature-amount-data space, the selected one of the predetermined number of negative data pieces being located at a distance that is a mean of distances from the judgment target data piece to the predetermined number of negative data pieces;

selecting one of the selected positive data piece and the selected negative data piece, the further selected one of the selected positive data piece and the selected negative data piece being located at a distance longer than not further selected one of the selected positive data piece and the selected negative data piece; and determining, as the region size, the distance from the judgment target data piece to the further selected one of the positive data piece and the negative data piece.

* * * * *